(12) United States Patent
Nakamura et al.

(10) Patent No.: US 6,273,270 B1
(45) Date of Patent: Aug. 14, 2001

(54) DAM FED UNROLLABLE MEDIA FILTER SUBSEQUENTLY FOLDED ALONG ITS LENGTH AND REWOUND

(75) Inventors: Shinichi Nakamura, Osaka; Kunihiko Fukuzuka, Habikino, both of (JP)

(73) Assignee: Omega Co. Ltd. (JP)

( * ) Notice: Subject to any disclaimer, the term of this patent is extended or adjusted under 35 U.S.C. 154(b) by 0 days.

(21) Appl. No.: 09/631,535

(22) Filed: Aug. 3, 2000

Related U.S. Application Data

(62) Division of application No. 09/306,598, filed on May 6, 1999.

(30) Foreign Application Priority Data

Aug. 25, 1998 (JP) .................................. 10-254521

(51) Int. Cl.[7] .............................. C02F 11/12; B01D 33/64
(52) U.S. Cl. ..................... 210/386; 210/387; 210/154; 100/37; 100/120; 100/121; 100/153
(58) Field of Search ................................ 210/386, 387, 210/769, 770, 154; 100/37, 120–121, 152–153

(56) References Cited

U.S. PATENT DOCUMENTS

| | | | |
|---|---|---|---|
| 2,664,203 | * | 12/1953 | Crane et al. ........................... 210/387 |
| 3,552,098 | * | 1/1971 | Cochran ................................. 210/387 |
| 3,581,896 | * | 6/1971 | Kuhlman ............................... 210/387 |
| 4,203,836 | * | 5/1980 | Hallack et al. ........................ 210/387 |
| 4,229,202 | * | 10/1980 | Mullerheim et al. ................. 210/387 |
| 4,713,181 | * | 12/1987 | Russell .................................. 210/387 |
| 4,867,873 | * | 9/1989 | Akazawa ............................... 210/387 |
| 5,433,851 | * | 7/1995 | Itoh ....................................... 210/387 |
| 6,146,540 | * | 11/2000 | Nakamura et al. ................... 210/387 |
| 6,190,570 | * | 2/2001 | Nakamura et al. ................ 210/242.3 |

FOREIGN PATENT DOCUMENTS 46-40989 * 3/1969 (JP) ...................................... 210/387

* cited by examiner

Primary Examiner—Robert J. Popovics
(74) Attorney, Agent, or Firm—Hayes, Soloway, Hennessey, Grossman & Hage, PC

(57) ABSTRACT

According to a waste water treatment method and apparatus of the present invention, a permeable sheet 3 is fed into a treatment tank 2 in which a stream is formed. The waste water, which flows downstream, is caused to pass through the permeable sheet 3, while the permeable sheet 3 travels in the treatment tank 2 so as to traverse the surface of the waste water on a downstream side in the flowing direction of the waste water. Therefore, not only the sludge in the waste water but also the oily substances floating in the waste water can be collected and removed because they cling to the permeable sheet 3 and are gathered by it. As a result, a waste water treatment tank 2 and the like can be maintained in a usable state for a long time. In addition, there can be obtained a treated water to which microbial treatment can be applied.

8 Claims, 6 Drawing Sheets

A : Before waste water is treated with permeable sheet

A : Before waste water is treated with permeable sheet

B : After waste water is treated with permeable sheet

DAM FED UNROLLABLE MEDIA FILTER SUBSEQUENTLY FOLDED ALONG ITS LENGTH AND REWOUND

CROSS-REFERENCE TO RELATED APPLICATIONS

This application is a Divisional of application Ser. No. 09/306,598, filed on May 6, 1999, which is currently "allowed" and pending "issue."

BACKGROUND OF THE INVENTION

1. Field of the Invention

The present invention relates to a waste water treatment method and apparatus for collecting sludge, oily substances, scum, and so on which exist in waste water, float and precipitate therein and for reducing the volume thereof by dehydrating them.

2. Description of the Related Art

Conventionally, waste water, which was discharged from kitchens, meat and marine product processing factories, oil manufacturing factories, oil and fat processing factories, repair shops, gas stations, and the like, included a large amount of wastes which contained animal oils and fats, vegetable oils and mineral oils, and wastes containing animal and vegetable oily substances which were made when various materials were processed.

Since these wastes must be previously removed from the waste water when the waste water is treated, they were conventionally separated and removed with nets, screen meshes and the like. However, when the waste water contains oily substances, they float in the waste water or on the surface thereof as grease-like lumps containing water and sludge or as scum-like lumps containing bubbles.

When the waste water is to be purified, it is an important theme to subject the waste water to biological treatment to permit a prescribed quantity of microorganisms to live in the waste water.

Microorganisms in water have a self-purifying capability. When, however, the amount of oxygen supplied into the water is smaller than the amount of oxygen consumed by them, aerobic microorganisms, which live by taking oxygen, will die because the amount of oxygen dissolved in water is reduced. When no oxygen exist in the water, anaerobic microorganisms, which take oxygen contained in organic matters, will breed and reduce and decompose the organic matters.

The biological treatment is classified into an aerobic treatment and an anaerobic treatment: in the aerobic treatment, oxygen contained in air is sufficiently supplied to polluted water by aeration and the like so that dirt is decomposed and purified; whereas, in the anaerobic treatment, air is prevented from being in contact with polluted water so that anaerobic organisms breed in the area where no oxygen exists and decompose and purify the dirt.

However, since the waste water from kitchens and the like contains a large amount of suspended oily substances, the waste water has a problem that oil sludge clings to a fluidized bed, that is, to the surfaces of carriers onto which microorganisms cling and chokes the microorganisms clinging onto the carriers when the biological treatment is performed.

Since the waste water containing the oily substances clogs nets, screen meshes and the like, the oily substances cannot be separated and removed. The animal oils and fats contained in waste water discharged from kitchens and the like are not solidified while they are at a high temperature. However, since they are solidified when cooled in such places as a raw water tank for treating waste water, a cesspool located at some midway point and a watercourse, the flow of the waste water is obstructed by the solidified animal oils and fats and cannot be treated well.

To remove scum and the like clinging to the tank and the like, there was conventionally employed a method of heating the portions of them which are liable to precipitate by steam or hot water piping. However, the scum and the like which contain sludge and residues, become creamy or sometimes contain bubbles have a problem that they cannot be removed even if they are heated as well as they are removed in only a limited amount even if a worker remove them with a rod or a ladle. Thus, there arises a problem that raw water tanks for treating waste water, cesspools located at some midway point and the like are made unusable.

SUMMARY OF THE INVENTION

To solve the above problems, a first object of the present invention is to provide a waste water treatment method and apparatus capable of obtaining treated water which can be subjected to a microbial treatment by at least collecting and removing oily substances floating in waste water.

A second object of the present invention is to provide a waste water treatment method and apparatus capable of maintaining a waste water treatment tank for storing and treating waste water and the like in a usable state for a long time by collecting and removing not only sludge precipitating in the waste water but also oily substances floating in the waste water.

The waste water treatment method of the present invention is characterized by comprising the steps of supplying waste water containing oily substances into a treatment tank and storing the waste water in the treatment tank; forming a stream to the waste water for causing the waste water to flow out of the treatment tank; feeding a permeable sheet into the treatment tank; causing the waste water, which flows downstream, to pass through the permeable sheet, while the permeable sheet travels in the treatment tank so as to traverse the surface of the waste water on a downstream side; and collecting the waste water having passed through the permeable sheet by causing precipitates and floating substances to cling onto the permeable sheet and gathering them by the permeable sheet.

According the above distinctive feature, the permeable sheet is fed into the treatment tank in which the stream is formed. The waste water, which flows downstream, is caused to pass through the permeable sheet, while the permeable sheet travels in the treatment tank toward the outside so as to traverse the surface of the waste water on the downstream side in the flowing direction of the waste water. Therefore, not only the sludge in the waste water but also the oily substances floating in the waste water can be collected and removed because they cling to the permeable sheet and are gathered by it. As a result, a waste water treatment tank and the like can be maintained in a usable state for a long time.

According to the waste water treatment method of the present invention, it is preferable that the permeable sheet is continuously or intermittently fed and collected.

With this arrangement, since the fresh surface of the permeable sheet is always fed, the clogging of the permeable sheet can be prevented and the clinging property of it can be improved.

According to the waste water treatment method of the present invention, it is preferable that the permeable sheet is moved while it is inclined obliquely upward with respect to the direction in which the waste water flows.

With this arrangement, since the area of the permeable sheet, onto which the substances floating on the surface of the waste water flowing downstream cling, is increased by the inclination of the permeable sheet, the filtrating effect of the permeable sheet can be improved.

According to the waste water treatment method of the present invention, it is preferable that the permeable sheet is pressed after precipitates and floating substances cling onto the permeable sheet.

With this operation, since the water contained in the permeable sheet is removed by pressing the permeable sheet, the weight of the permeable sheet can be reduced as well as the permeable sheet can be easily destroyed by fire in the next process.

According to the waste water treatment method of the present invention, it is preferable that the permeable sheet is pressed by a press means after it is folded to two strip-shaped sections by a guide means while it is moved.

With this arrangement, since the permeable sheet is folded to the two sections, the fluid oily substances, sludge and the like which cling to the permeable sheet can be continuously pressed without removing from the permeable sheet.

According to the waste water treatment method of the present invention, it is preferable that the permeable sheet having been pressed is destroyed by fire in the state it is wound to a roll shape or in the state as it is as a strip shape.

With this operation, since the permeable sheet is wound to the roll shape or formed to the strip shape, it can be made compact and easily transported. Further, the permeable sheet can be sanitarily disposed of because it is destroyed by fire so that germs and the like die out.

A waste water treatment apparatus of the present invention is characterized by comprising a treatment tank in which waste water containing oily substances is stored so as to form a stream; a permeable sheet continuously or intermittently fed to the vicinity of the bottom of the treatment tank; and a permeable sheet drive unit for collecting the permeable sheet so that it traverses at least the surface of the waste water with respect to the stream of the waste water on a downstream side, wherein the waste water flowing downward is caused to pass through the permeable sheet to thereby obtain purified water.

According to the above distinctive feature, the permeable sheet is fed into the treatment tank in which the stream is formed by driving the permeable sheet drive unit. The waste water, which flows downstream, is caused to pass through the permeable sheet, while the permeable sheet travels in the treatment tank toward the outside so as to traverse the surface of the waste water on the downstream side in the flowing direction of the waste water. Therefore, not only the sludge in the waste water but also the oily substances floating in the waste water can be collected and removed because they cling to the permeable sheet and are gathered by it. As a result, the waste water treatment tank and the like can be maintained in a usable state for a long time.

A waste water treatment apparatus of the present invention is characterized by comprising a waste water storing tank for storing waste water containing oily substances and supplied thereinto; a waste water treatment tank for storing the waste water having been treated; a dam with a prescribed width formed to the upper end edge of the waste water storing tank on a downstream side for causing at least the upper surface of the waste water to flow out of the dam; and a strip-shaped permeable sheet fed from just below the dam so as to traverse obliquely upward the waste water flowing out of the dam in the flowing direction of the waste water, wherein the waste water having been treated through the permeable sheet is stored in the waste water treatment tank.

According to the above distinctive feature, since the waste water, whose stream is formed in the treatment tank, is caused to pass through the permeable sheet which is continuously fed, at least the oily substances floating in the waste water in the treatment tank can be collected and removed because they cling to the permeable sheet and are gathered by it. As a result, a treated water to which microbial treatment can be applied can be obtained.

According to the waste water treatment apparatus of the present invention, it is preferable that the permeable sheet is stretched through a guide means so as to traverse obliquely upward the surface of the waste water on the downstream side of the waste water treatment tank, the extended portion of the permeable sheet is folded and pressed by a press means while the extended portion is moved and the pressed and folded permeable sheet is wound by a winding means in a stretched state.

With this arrangement, since the water contained in the permeable sheet is removed by pressing the permeable sheet, the weight of the permeable sheet can be reduced as well as the permeable sheet can be easily destroyed by fire in the next process.

According to the waste water treatment apparatus of the present invention, it is preferable that the permeable sheet is composed of a nonwoven fabric cloth or a waterproof converted paper.

With this arrangement, since the flowing waste water is filtered through the permeable sheet, even if the permeable sheet is dipped into the treatment tank, the strength of the permeable sheet can be maintained for a long time.

DESCRIPTION OF THE PREFERRED EMBODIMENT

Figure 1:
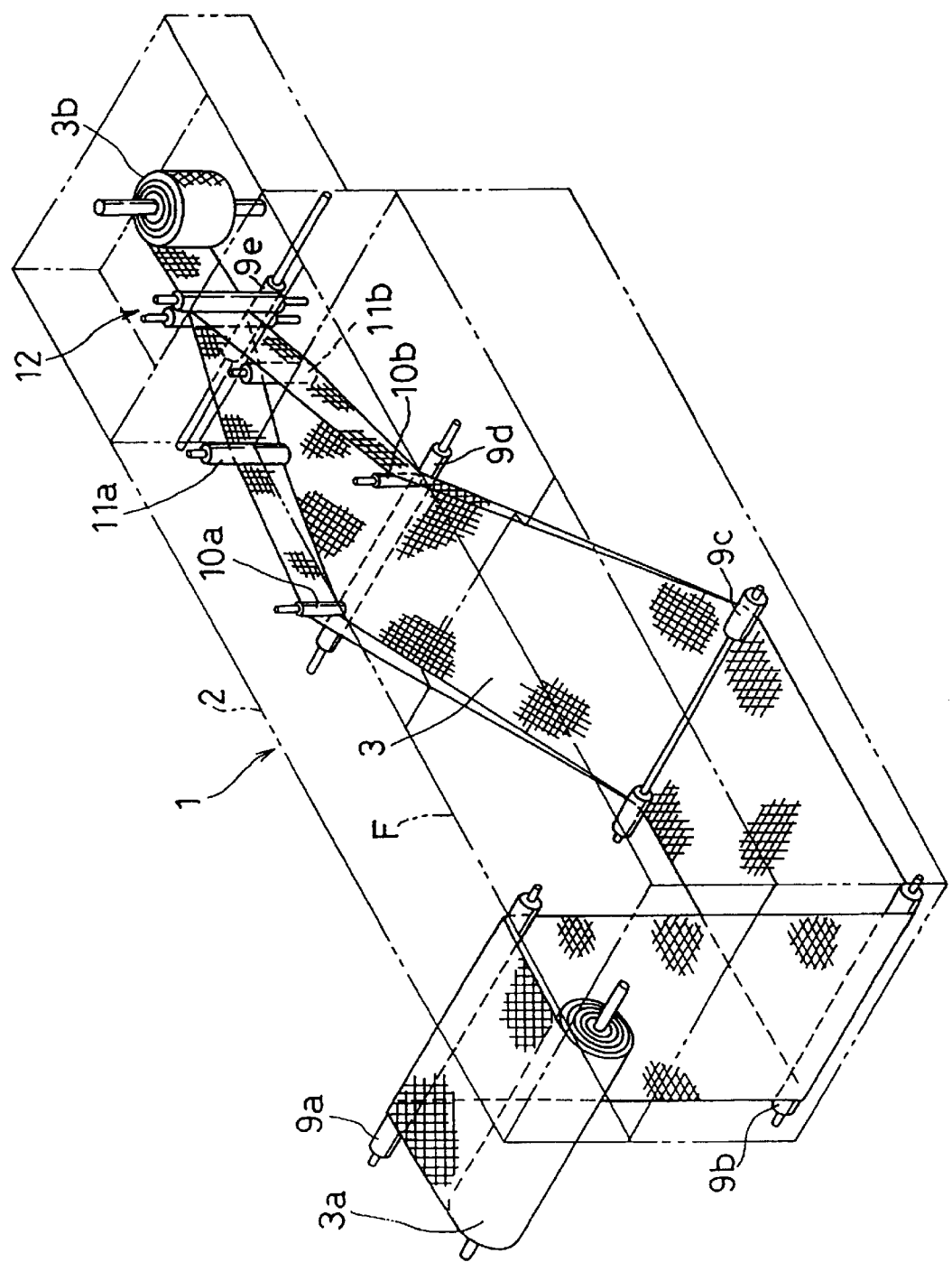
FIG. 1 is an overall perspective view showing the state that a permeable sheet which is used to a waste water treatment apparatus as a first embodiment of the present invention is laid in a treatment tank.
Figure 2:
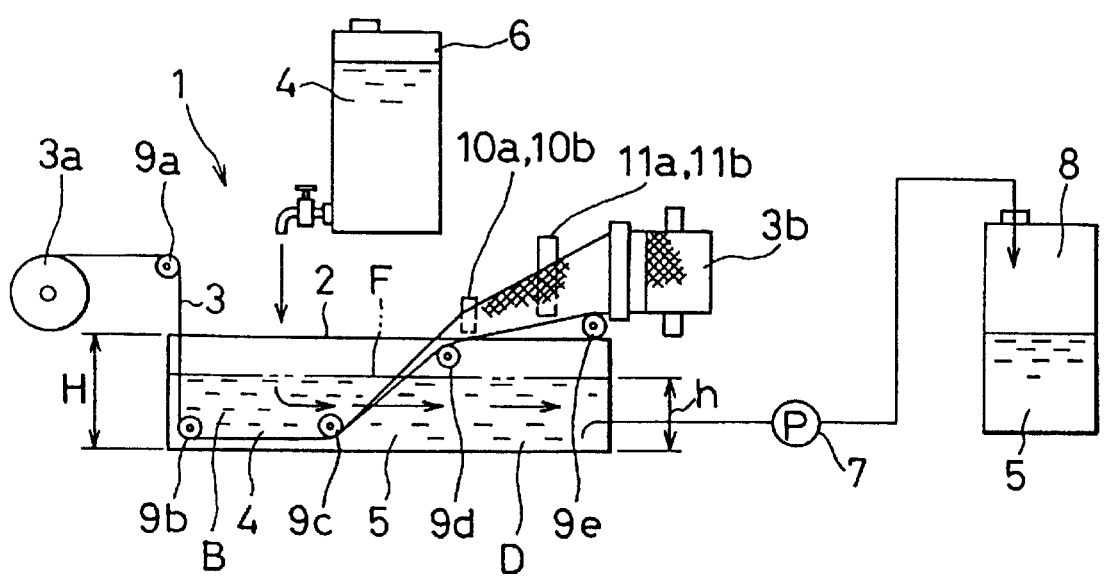
FIG. 2 is a side elevational view describing the waste water treatment apparatus as a whole.

Embodiments of the present invention will be described based on the drawings. FIG. 1 is an overall perspective view showing the state that a permeable sheet which is used to a waste water treatment apparatus is laid in a treatment tank and FIG. 2 is a side elevational view describing the waste water treatment apparatus as a whole.

First, a first embodiment of the waste water treatment apparatus of the present invention will be described. As shown in FIG. 1 and FIG. 2, numeral 1 denotes a waste water treatment apparatus which is essentially composed of a treatment tank 2 for storing a dirty waste water 4 which is discharged from the kitchens and the like of restaurants, hotels, and other eating houses to a waste water storage tank 6, temporarily stored therein and supplied therefrom; a permeable sheet 3, which is continuously or intermittently fed into the waste water stored in the treatment tank 2 so as to form a stream, for removing oily scum floating in the waste water and sludge and the like precipitating in the waste water 4 as well as filtrating the waste water 4, a treated water storage tank 8 for storing a treated waste water 5 which is filtered through the permeable sheet 3 and supplied by a pump 7.

More specifically, a prescribed stream is formed in the treatment tank 2 in such a manner that the waste water 4 containing oily substances is supplied from the waste water storage tank 6 into the treatment tank 2 and then supplied from the treatment tank 2 into the treated water storage tank 8 by the pump 7 in a prescribed quantity.

The waste water 4 to be treated gets muddy to white and contains countless fine fiber-like suspended matters floating therein and oily scum (grease-like) floating matters composed of soft and hard white fats containing water and having a size of about 2–10 mm.

In this case, the waste water 4 which flows into the treatment tank 2 having a height H has a depth h up to a water surface F which is maintained to a constant level at all times because the flow rate of the waste water 4 flowing out of the treatment tank 2 is regulated by the pump 7.

The permeable sheet 3 used in the waste water treatment apparatus 1 comprises a nonwoven fabric cloth or a waterproof converted paper. More specifically, it is preferable that the permeable sheet 3 comprises highly hydrophilic fibers used for paper pulp or fibers composed of a hydrophilic polymer containing a hydrophilic group such as polyester, polyvinylalcohol, etc. and fibers composed of a hydrophobic polymer compound such as polypropylene, polyethylene, etc.

Since the permeable sheet 3 mainly comprises the waterproof converted paper such as a recycled paper or the like and the strength of the permeable sheet 3 can be obtained by the fibers such as polyethylene, polyester, etc., even if the permeable sheet 3 is dipped into the waste water in the treatment tank, the strength of the permeable sheet 3 can be maintained for a long time. In addition, floating oily substances and the like can be collected by preferably filtering the flowing-out waste water while balancing a lipophilic property and a hydrophilic property.

The permeable sheet 3 arranged as described above is formed to a strip shape and wound to a roll shape. A roll member 3a is rotatably supported at an end of the treatment tank 2 on an upstream side. The permeable sheet 3 is bent and guided from above the opening of the treatment tank 2 at an end thereof by horizontally-supported guide rollers 9a, 9b, 9c and laid above the bottom of the treatment tank 2. Further, the permeable sheet 3 is fed upward from the guide roller 9c so as to traverse the surface F of the waste water obliquely upward with respect to the stream of the waste water 4 on a downstream side, bent approximately horizontally in a longitudinal direction by a guide roller 9d disposed at an upper position, and the lower surface of the horizontally extended portion of the permeable sheet 3 is supported by a guide roller 9e.

A pair of squeeze rollers 12 as press members are vertically supported in close proximity to and parallel with each other at the position where the guide roller 9e is supported. The edges of the upper surface on both the sides of the permeable sheet 3, which has been flatly extended and laid above the bottom of the treatment tank 2, are gradually bent in a width direction from the position where the permeable sheet 3 has passed through the guide roller 9d, and the extended portion of the permeable sheet 3 is folded to two sections by the squeeze rollers 12 and both the sides of the permeable sheet 3 are squeezed and pressed by the squeeze rollers 12. The permeable sheet 3 having passed through the squeeze rollers 12 is wound to a roll shape in a longitudinal direction in a stretched state by a winding member 3b which is rotated by a not shown drive unit.

A pair of vertical rollers 10a and 10b and a pair of vertical rollers 11a, 11b are vertically supported between the guide roller 9d disposed at the upper position and the squeeze rollers 12 to gradually narrow the width of the permeable sheet 3. The permeable sheet 3 is regulated in the width direction thereof by the vertical rollers 10a, 10b and 11a, 11b so that the bent heights of both the side edges of the permeable sheet 3 are not abruptly increased and both the side edges are gradually raised from the inclined surface of the permeable sheet 3 to obtain a flat surface in a prescribed area. With this arrangement, the oily substances and the like clinging onto the upper surface of the permeable sheet 3 are kept from spilling.

According to the waste water treatment apparatus arranged as described above, first, the roll member 3a around which the strip-shaped permeable sheet 3 is wound is rotatably supported at the one end of the treatment tank 2, the permeable sheet 3 drawn from the roll member 3a is fed obliquely upward through a portion of the bottom of the treatment tank 2 and gradually squeezed while both the end edges of the extended portion of the permeable sheet 3 are folded upward in the width direction thereof, both the sides of the permeable sheet 3 folded to the two sections are pressed by the pair of squeeze rollers 12 and subsequently the permeable sheet 3 is wound to the roll shape by the winding member 3b so that it is laid in the stretched state as shown in FIG. 1 and FIG. 2.

In this state, the waste water 4 containing oily substances, which is discharged from a not shown kitchen or the like, is discharged from the waste water storage tank 6 onto the permeable sheet 3 laid above the bottom of the treatment tank 2 in a prescribed quantity and stored in the treatment tank 2 until the depth of the surface of the waste water 4 is made to h. At the time, the waste water is caused to flow into the treated water storage tank 8 by starting the pump 7 to thereby form the stream in the treatment tank 2.

The winding member 3b which is rotated by a worker or power permits the permeable sheet 3 to move in the longitudinal direction while being pulled.

The waste water 4, which contains the oily substances and is continuously supplied into the treatment tank 2, is stored therein as well as a slow stream is formed to the waste water 4. When oil sludge and the like cling onto the upper surface of the permeable sheet 3 after a while in the process that the waste water 4 is caused to pass through the obliquely stretched permeable sheet 3 by the stream, the level of the treated waste water 5 having passed through the permeable sheet 3 is somewhat lowered as compared with the initial level of it.

When the permeable sheet 3 is moved by a prescribed length in the longitudinal direction by rotating the winding member 3b little by little, the waste water 4 passes through the surface of the inclined permeable sheet 3 in the process it is moved, whereby the oily substances and the like floating in the waste water 4 are caused to cling onto the upper surface of the permeable sheet 3.

Next, the treated waste water 5 having been treated by passing through the permeable sheet 3 is supplied into the treated water storage tank 8 by the pump 7 and stored therein.

With this operation, not only the sludge precipitating in the waste water 4 but also the oily substances floating in the waste water 4 are collected and removed by clinging onto the permeable sheet 3 and being gathered by it in such a manner that the permeable sheet 3 is fed to the bottom of the treatment tank 2 from the upstream side of the treatment tank 2; while the permeable sheet 3 passes through a portion of the bottom of the treatment tank 2, it is continuously or intermittently fed toward the outside so as to traverse the surface of the waste water on the downstream side thereof obliquely upward in the flowing direction of the waste water so that the waste water 4 flowing downstream passes through the permeable sheet 3. As a result, the treatment tank 2 and the like can be maintained in a usable state for a long time.

Figure 6:
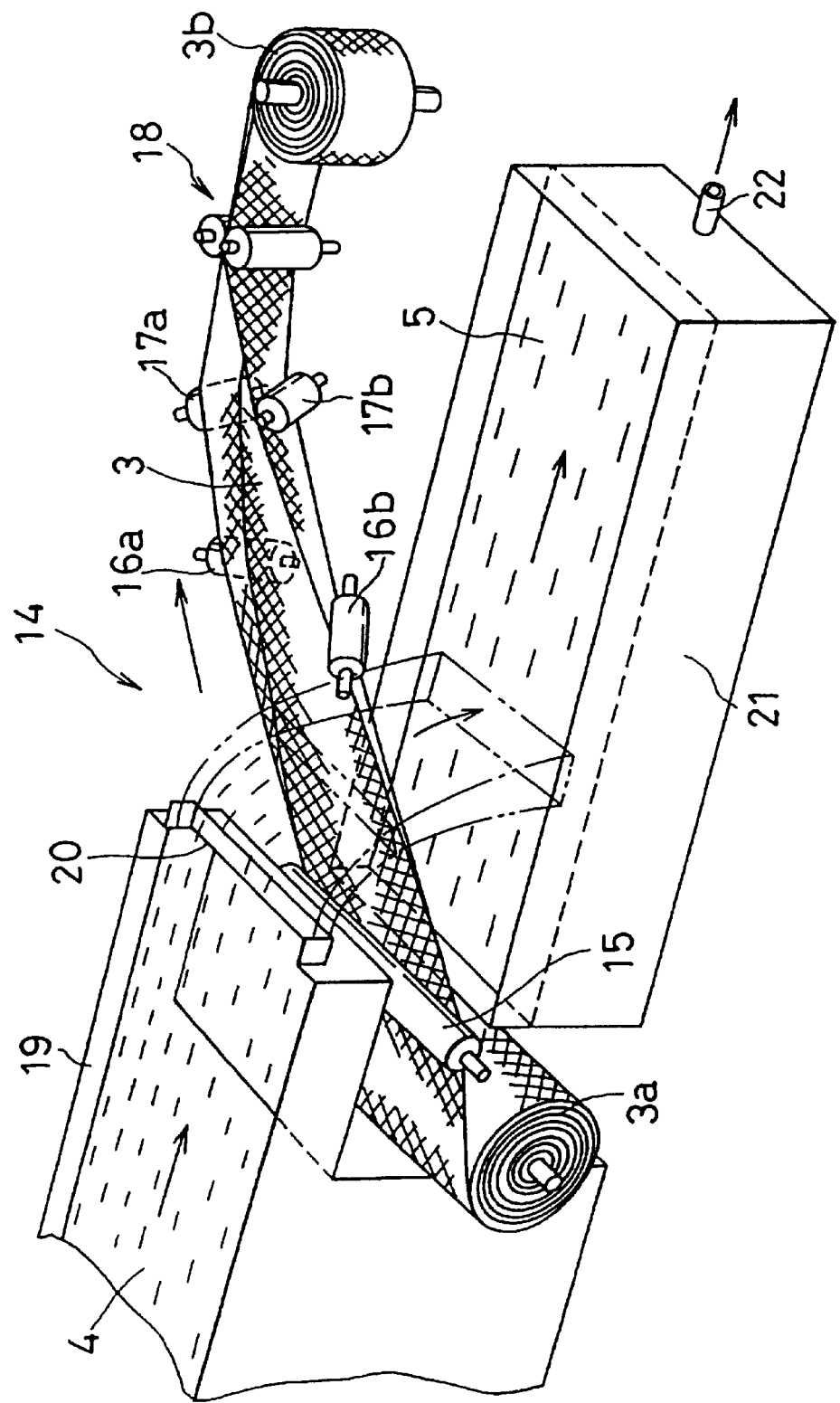
FIG. 6 is a perspective view of the waste water treatment apparatus as a second embodiment of the present invention.

Next, a second embodiment of the waste water treatment apparatus of the present invention will be described. FIG. 6 is a perspective view of the waste water treatment apparatus as the second embodiment of the present invention. The same numerals as used for the above components are used to denote the same components and overlapping description will be omitted.

The second embodiment is different from the first embodiment in that a discharging dam is formed on an end of a treatment tank and only the oily substances floating in waste water is collected in such a process that the waste water which has flown into the treatment tank and has been stored in it is caused to pass through a permeable sheet when it flows out of the treatment tank.

That is, numeral 14 denotes a waste water treatment apparatus which is composed of two treatment tanks, that is, a waste water storing tank 19 into which waste water 4 containing oily substances flows and is stored therein and a waste water treatment tank 21 for storing the waste water having been treated. A dam 20 with a prescribed width, from which at least the upper portion of the waste water 4 can flow out, is formed to the upper end edge of the waste water storing tank 19 on a downstream side. A strip-shaped permeable sheet 3 is continuously or intermittently fed from just below the dam 20 so as to traverse obliquely upward the waste water 4 flowing out of the dam 20 in the flowing direction of the waste water 4. A treated waste water 5 having been treated through the permeable sheet 3 is stored in the waste water treatment tank 21.

More specifically, the dam 20 projecting from the upper end edge of the waste water storing tank 19 has a width near to the width of the waste water storing tank 19 and a shallow depth. A roll member 3a around which the strip-shaped permeable sheet 3 is wound is rotatably and horizontally supported just below the dam 20.

The permeable sheet 3 drawn out from the roll member 3a is squeezed by a horizontally supported guide roller 15, a pair of guide rollers 16a and 16b, and a pair of guide rollers 17a and 17b. The pair of guide rollers 16a and 16b are supported in an inclined state for supporting the extended portion of the permeable sheet 3 stretched obliquely upward from the guide roller 15 from both the sides thereof in the state that the extended portion of the permeable sheet 3 is bent to a V-shape with the upper surface thereof facing inward in the inclined state. The pair of guide rollers 17a and 17b are supported in the state that they are inclined more than the pair of guide rollers 16a and 16b. Thereafter, the extended portion of the permeable sheet 3 is pressed by a pair of squeeze rollers 18 which are disposed in close proximity to each other and wound to a roll state by a winding member 3b rotated by, for example, a not shown drive unit in the state that it is stretched in a longitudinal direction.

The permeable sheet 3 drawn out from the roll member 3a is stretch obliquely upward from the guide roller 15. However, the permeable sheet 3 may be stretched so as to be inclined in an opposite direction (in a descending direction) by another guide roller disposed forward of the guide roller 15. At the time, even if what clings onto the permeable sheet 3 is a fluid substance, it can be reliably captured without flowing down along the permeable sheet 3.

In the waste water treatment apparatus 14 arranged as described above, the waste water 4 which contains oily substances and the like and is discharged from a not shown kitchen or the like is discharged from, for example, a waste water storage tank 6 into the waste water storing tank 19 in a prescribed quantity. When the level of the waste water is raised and the upper portion of the waste water which has passed through the dam 20 is caused to flows out, the waste water is filtered when it passes through the permeable sheet 3 stretched in the inclined state, the oily substances floating in the waste water 4 cling onto the permeable sheet 3, and the treated waste water 5 having passed through the permeable sheet 3 is caused to flow out of a discharge port 22 into the waste water treatment tank 21 by a not shown pump and stored therein.

The treated waste water 5 stored in the waste water treatment tank 21 does not disturb the execution of a microbial treatment because it is filtered through the permeable sheet 3, which will be described later in detail.

With the above arrangement, when the waste water treatment tank 21 shown in FIG. 6 is used as a portion of a grease pit for waste water containing a large quantity of oily substances or as a portion of an oily water separator, it can easily collect and dehydrate the oily substances.

When the waste water treatment tank 21 is equipped with an aggregating/floating treatment apparatus for waste water, even floating scum can be simply and easily collected and dehydrated, although it is difficult to treat the floating scum by an ordinary treatment.

Figure 3:
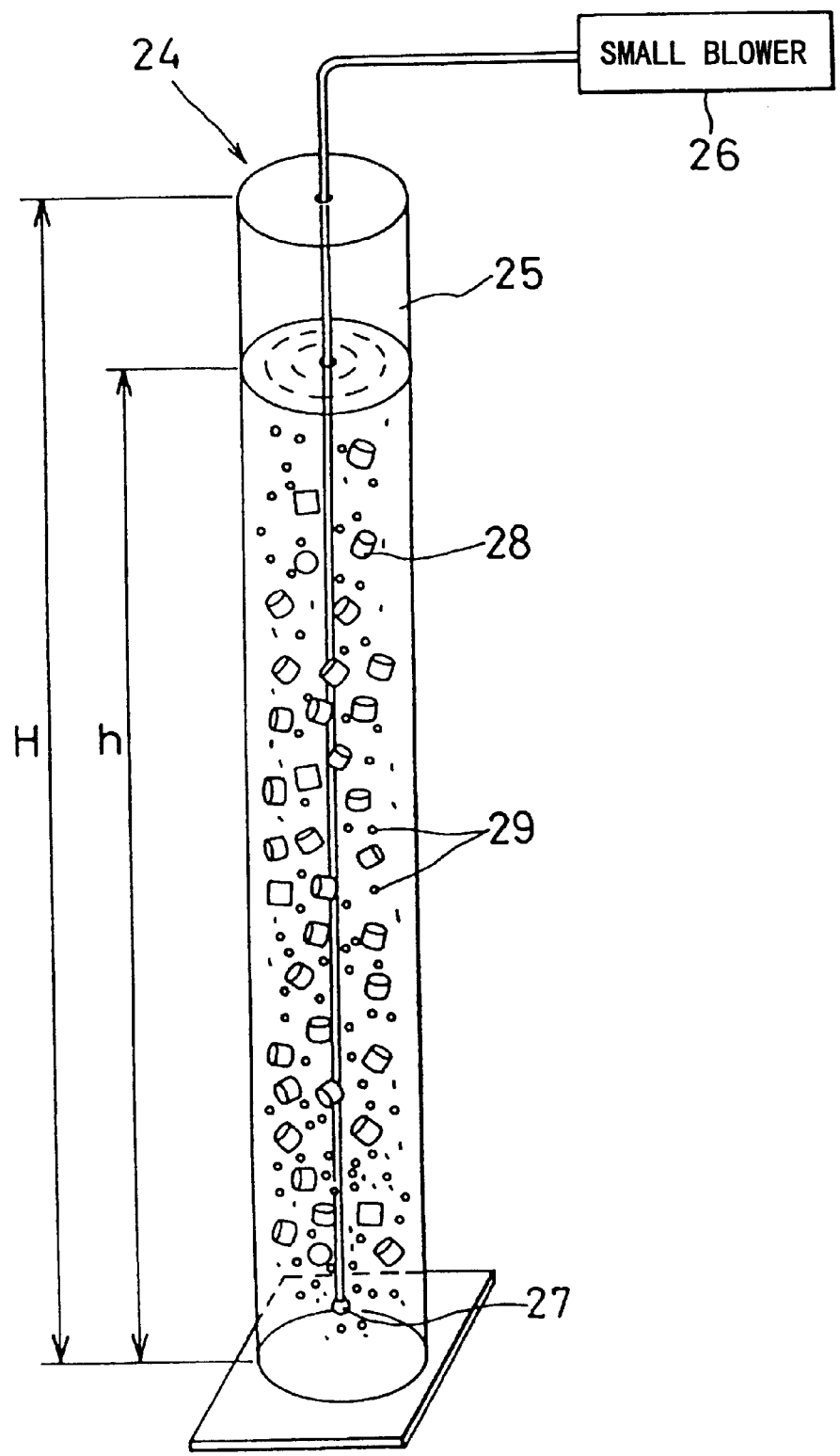
FIG. 3 describes a test method performed by a biological treatment test device before and after waste water is treated.
Figure 4:
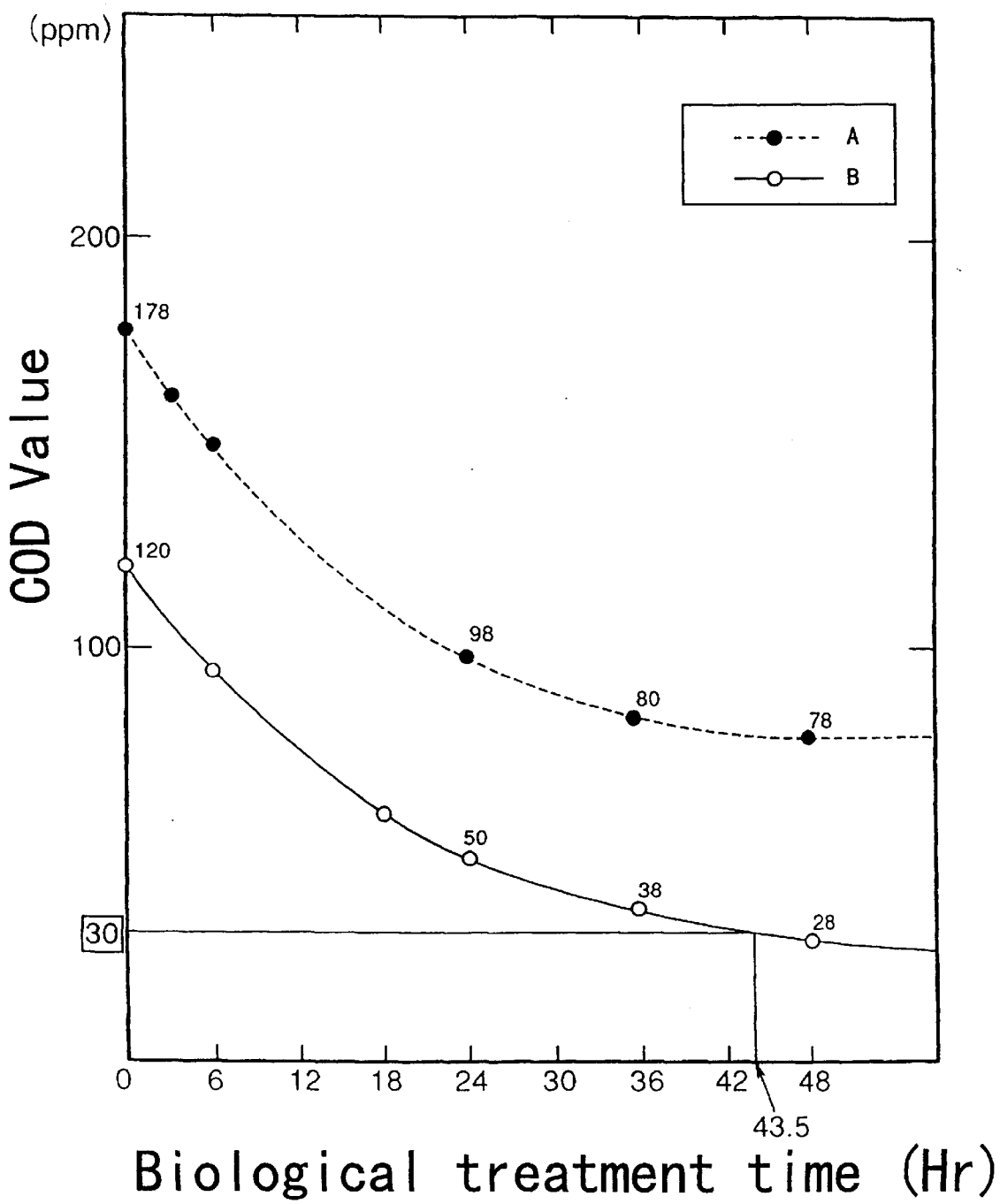
FIG. 4 shows a graph illustrating the time series change of a biological treatment to a COD value before and after waste water is treated.
Figure 5:
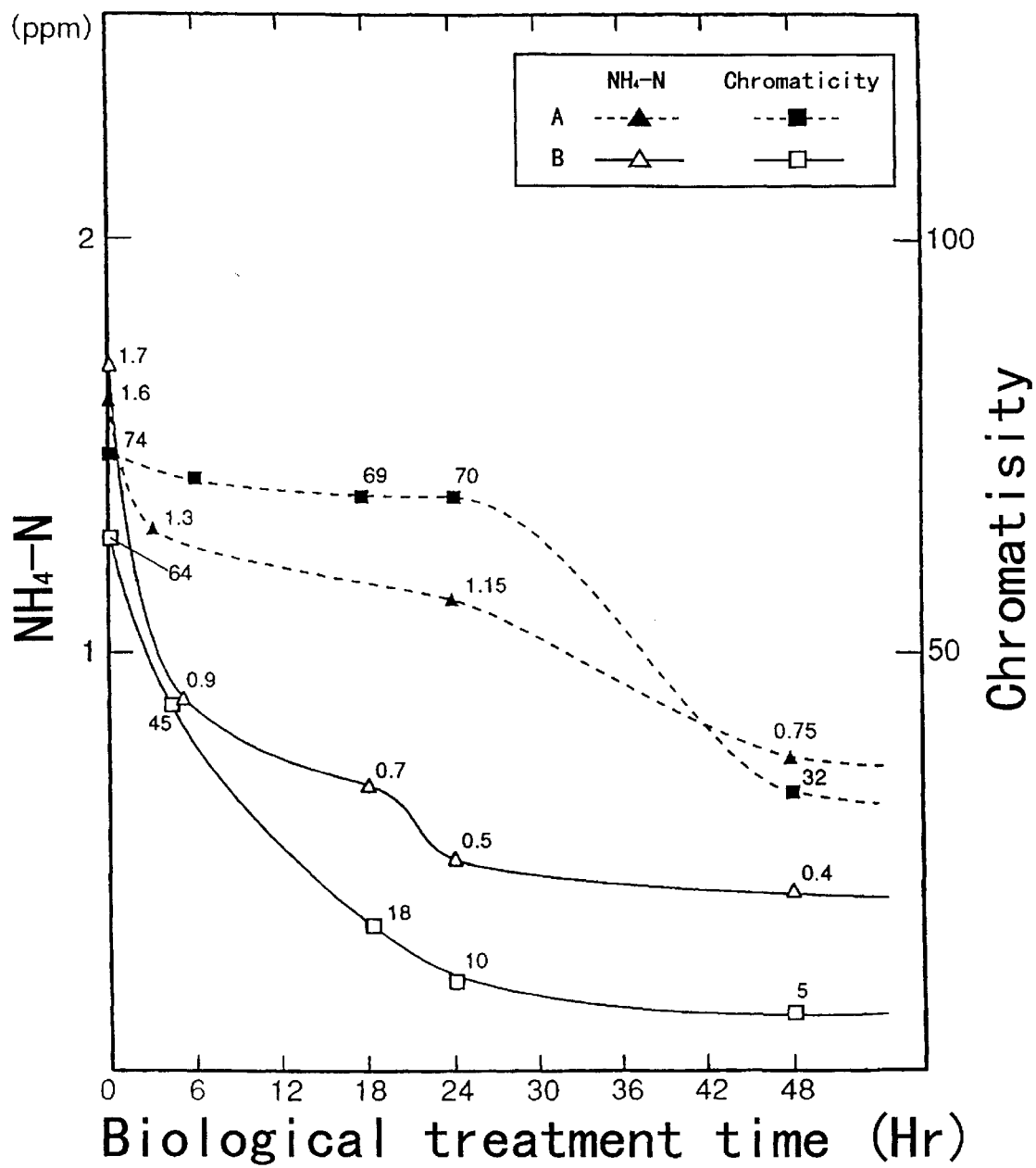
FIG. 5 shows a graph illustrating the time series change of a biological treatment to $NH_4$—N and chromaticity before and after waste water is treated.

Next, a waste water treatment method of the present invention will be described. FIG. 3 describes a test method performed by a biological treatment test device before and after waste water is treated, FIG. 4 shows a graph illustrating the time series change of the biological treatment to a COD value before and after waste water is treated, and FIG. 5 shows a graph illustrating the time series change of the biological treatment to $NH_4$—N and chromaticity before and after waste water is treated.

The waste water treatment method of the present invention treats waste water using the waste water treatment apparatus 1, which is shown in FIG. 1 and FIG. 2 and embodies the waste water treatment method of the present invention.

That is, according to the waste water treatment method, the waste water 4 containing the oily substances flows into the treatment tank 2 and is stored therein as well as a stream is formed by causing the waste water 4 to flow out in a prescribed quantity; the permeable sheet 3 is fed to the bottom of the treatment tank 2 from the one end of the treatment tank 2 on the upstream side thereof and then fed toward the outside of the treatment tank 2 so as to traverse the surface F of the waste water on the downstream side thereof obliquely upward in the flowing direction of the waste water while the permeable sheet 3 passes through a portion of the bottom of the treatment tank 2; the permeable sheet 3 gathers precipitates such as cooked food material waste, residues removed from tableware being washed, and the like, and floating substances such as animal and vegetable fats which float in a scum state by causing them to cling to the permeable sheet 3 when it passes through the waste water 4 flowing downstream; the treated waste water 5 having passed through the permeable sheet 3 is collected; and the permeable sheet 3 is dehydrated by being folded and pressed.

Table 1 shows the quality of the waste water 4 at a portion B before it was treated through the treatment tank 2 shown in FIG. 2 and the quality of the treated waste water 5 after it was treated through the permeable sheet 3.

Table 1

According to Table 1, the waste water having been treated is not greatly different from the waste water before it is treated as to $NH_4$—N (ammonia nitrogen) and chromaticity. However, the values of a chemical oxygen consumption (COD), a suspended substance (SS) and a N-hexane extract of the waste water 4 before it is treated are greatly reduced as compared with those of the treated waste water 5.

This exhibits that the oily substances have been sufficiently removed, and thus it is expected that the execution of the biological treatment is not disturbed by the sludge which includes the oily substances and clings onto the surfaces of carriers to which microorganisms are fixed.

Next, the changes of the COD, the $NH_4$—N and the chromaticity of the waste waters before and after they were treated were observed in time series using a test device 24 shown in FIG. 3.

In the test device 24, a volume of 5 liters of the waste water before or after it was treated was accommodated in a transparent cylinder 25 having a height H of 72 cm so that the depth h of the waste water was made to 62 cm, and bubbles 29 were generated by charging air from a small blower 26 into the waste water through an air diffusing air stone 27 disposed on the bottom of the cylinder 25.

Cylindrical plastic pieces (diameter: 10 mm, length: 10 mm) made by Tsutsunaka Plastic Co. Ltd. were used in the quantity of 750 milliliters to the 5 liters of the waste water (volume ratio: 15%) as fluidized bed fixing carriers 28.

As fixing carriers for fixing microorganisms for purifying waste water, the fixing carriers which had been used for the treatment of the waste water and onto which microorganisms had clung were used after the microorganisms were previously domesticated in the waste water from a kitchen for one week.

As a result, as shown in the graph of FIG. 4, although the COD value of the waste water shown by a dotted line was reduced from 178 ppm to 78 ppm in 48 hours before it was treated, it was not changed thereafter.

Since the nutrients required by the microorganisms in the waste water from a kitchen are not balanced as compared with the nutrients required by the microorganisms in a combined treatment tank, it is conceived that the limit of the COD value is about 30 ppm which is by no means obtained in the waste water even in time series before it is treated. However, the COD value of 30 ppm can be obtained in 43.5 hours in the waste water after it is treated as shown by the solid line of FIG. 4.

Further, as shown in the graph of FIG. 5, the values of the $NH_4$—N and the chromaticity were greatly reduced in time series.

As described above, the same effect as that obtained by the above waste water treatment apparatus can be also obtained by the embodiment of the waste water treatment method and the description of it is omitted here because it is overlapped.

Since the permeable sheet 3 is continuously or intermittently fed and collected, the fresh surface of it is always supplied, whereby the clogging of the permeable sheet 3 is prevented and the clinging property thereof is improved.

Since the permeable sheet 3 is disposed obliquely upward with respect to the flowing direction of the waste water, the area of the permeable sheet, onto which the substances floating on the surface of the waste water which flows downward cling, is increased by the inclination of the permeable sheet 3.

Further, since permeable sheet 3 is pressed, the water contained in the oily substances clinging to the permeable sheet 3 and gathered by it is removed in the process in which the permeable sheet 3 is pressed. Thus, the oily substances can be easily destroyed by fire. In addition, since the permeable sheet 3 is wound to the roll shape or formed to the strip shape, it is light in weight and compact and can be easily transported.

While the embodiments of the present invention have been described above with reference to the drawings, the specific arrangement of the present invention is by no means limited to the above embodiments and it goes without saying that various modifications and additions made within the range which does not depart from the gist of the present invention can be included in the invention.

The present invention will achieve the following effects.

(a) According to a first aspect of the present invention, the permeable sheet is fed into the treatment tank in which the stream is formed. The waste water, which flows downstream, is caused to pass through the permeable sheet, while the permeable sheet travels in the treatment tank toward the outside so as to traverse the surface of the waste water on the downstream side in the flowing direction of the waste water. Therefore, not only the sludge in the waste water but also the oily substances floating in the waste water can be collected and removed because they cling to the permeable sheet and are gathered by it. As a result, a waste water treatment tank and the like can be maintained in a usable state for a long time.

(b) According to a second aspect of the present invention, since the fresh surface of the permeable sheet is always fed, the clogging of the permeable sheet can be prevented and the clinging property of it can be improved.

(c) According to a third aspect of the present invention, since the area of the permeable sheet, onto which the substances floating on the surface of the waste water flowing downstream cling, is increased by the inclination of the permeable sheet, the filtrating effect of the permeable sheet can be improved.

(d) According to a fourth aspect of the present invention, since the water contained in the permeable sheet is removed by pressing the permeable sheet, the weight of the permeable sheet can be reduced as well as the permeable sheet can be easily destroyed by fire in the next process.

(e) According to a fifth aspect of the present invention, since the permeable sheet is folded to the two sections, the fluid oily substances, sludge and the like which cling to the permeable sheet can be continuously pressed without removing from the permeable sheet.

(f) According to a sixth aspect of the present invention, since the permeable sheet is wound to the roll shape or formed to the strip shape, it can be made compact and easily transported. Further, the permeable sheet can be sanitarily disposed of because it is destroyed by fire so that germs and the like die out.

(g) According to a seventh aspect of the present invention, the permeable sheet is fed into the treatment tank in which the stream is formed by driving the permeable sheet drive unit. The waste water, which flows downstream, is caused to pass through the permeable sheet, while the permeable sheet travels in the treatment tank toward the outside so as to traverse the surface of the waste water on the downstream side in the flowing direction of the waste water. Therefore, not only the sludge in the waste water but also the oily substances floating in the waste water can be collected and removed because they cling to the permeable sheet and are gathered by it. As a result, a waste water treatment tank and the like can be maintained in a usable state for a long time.

(h) According to an eighth aspect of the present invention, since the waste water, whose stream is formed in the treatment tank, is caused to pass through the permeable sheet which is continuously fed, at least the oily substances floating in the waste water in the treatment tank can be collected and removed because they cling to the permeable sheet and are gathered by it. As a result, there can be obtained a treated water to which microbial treatment can be applied.

(i) According to a ninth aspect of the present invention, since the water contained in the permeable sheet is removed by pressing the permeable sheet, the weight of the permeable sheet can be reduced as well as the permeable sheet can be easily destroyed by fire in the next process.

(j) According to a tenth aspect of the present invention, since the flowing waste water is filtered through the permeable sheet, even if the permeable sheet is dipped into the treatment tank, the strength of the permeable sheet can be maintained for a long time.

TABLE 1

|  | Type | Volume | COD | $NH_4$—N | Chromatisity | SS | N-hexane extract |
| --- | --- | --- | --- | --- | --- | --- | --- |
| Portion B | Waste water from kitchen | 0.5 l | 178 ppm | 1.6 ppm | 74 | 630 ppm | 491 ppm |
| Portion C | Treated water | 0.7 l | 120 ppm | 1.7 ppm | 64 | 216 ppm | 23 ppm |

What is claimed is:

1. A waste water treatment apparatus, comprising:
   a waste water storage tank for storing waste water containing oily substances and supplied thereinto;
   a waste water treatment tank for storing the waste water having been treated;
   a dam with a prescribed width formed to the upper end edge of said waste water storage tank on a downstream side for causing at least the upper surface of the waste water to flow out of said dam;
   a strip-shaped permeable sheet fed from a roll just below said dam so as to traverse obliquely upward the waste water flowing out of said dam in the flowing direction of the waste water;
   a plurality of guide rollers causing said strip-shaped permeable sheet to be folded along its length; and
   a winding member to wind the resultant folded sheet into a roll;
   wherein the waste water having been treated by passing through said permeable sheet is stored in said waste water treatment tank.

2. A waste water treatment apparatus according to claim 1 and including a drive for continuously or intermittently feeding and collecting the permeable sheet.

3. A waste water treatment apparatus according to claim 2, wherein the permeable sheet is inclined obliquely upward with respect to the direction in which the waste water flows.

4. A waste water treatment apparatus according to claim 1, and comprising press members for pressing the permeable sheet after precipitates and floating substances cling onto the permeable sheet.

5. A waste water treatment method according to claim 1, and further comprising press members for pressing the permeable sheet after it is folded to two strip-shaped sections by said guide members.

6. A waste water treatment apparatus according to claim 1, wherein said permeable sheet is stretched through a guide means so as to traverse obliquely upward the surface of the waste water on the downstream side of said treatment tank, the extended portion of said permeable sheet is folded and pressed by press members while the extended portion is moved and the pressed and folded permeable sheet is would by a winding member in a stretched state.

7. A waste water treatment apparatus according to claim 6, wherein said permeable sheet comprises a nonwoven fabric cloth or a waterproof converted paper.

8. A waste water treatment apparatus according to claim 1, wherein said permeable sheet comprises a nonwoven fabric cloth or a waterproof converted paper.

* * * * *